(12) United States Patent
Nagarajan et al.

(10) Patent No.: US 7,421,147 B2
(45) Date of Patent: Sep. 2, 2008

(54) HYBRID TEMPLATE MATCHING FOR IMAGING APPLICATIONS

(75) Inventors: Ramesh Nagarajan, Pittsford, NY (US); Chia-Hao Lee, Hacienda Heights, CA (US); Francis Kapo Tse, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 396 days.

(21) Appl. No.: 11/196,144

(22) Filed: Aug. 2, 2005

(65) Prior Publication Data

US 2007/0031061 A1 Feb. 8, 2007

(51) Int. Cl.
*G06K 9/36* (2006.01)
*G06K 9/46* (2006.01)

(52) U.S. Cl. .................. 382/276; 382/232; 382/217; 382/159

(58) Field of Classification Search ............. 382/159, 382/209, 217, 232, 276
See application file for complete search history.

(56) References Cited

U.S. PATENT DOCUMENTS

| | | | | |
|---|---|---|---|---|
| 5,387,985 A | * | 2/1995 | Loce et al. ............ | 358/447 |
| 6,343,159 B1 | | 1/2002 | Cuciurean-Zapan et al. | 382/284 |
| 6,628,834 B2 | * | 9/2003 | Gotsman et al. ........ | 382/209 |
| 6,807,304 B2 | * | 10/2004 | Loce et al. ............ | 382/209 |
| 6,944,341 B2 | * | 9/2005 | Loce et al. ............ | 382/209 |
| 7,245,779 B2 | * | 7/2007 | Keithley ............... | 382/254 |
| 2002/0076107 A1 | * | 6/2002 | Loce et al. ............ | 382/209 |
| 2005/0100208 A1 | * | 5/2005 | Suzuki et al. ........ | 382/157 |

* cited by examiner

*Primary Examiner*—Samir A. Ahmed
*Assistant Examiner*—Stephen R Koziol
(74) *Attorney, Agent, or Firm*—Richard H. Krukar; Kermit D. Lopez; Luis M. Ortiz

(57) ABSTRACT

Training sets consisting of pairs of input images and desired images can be used to produce maps intended for future use in transforming input images into final images. The maps, however, often have improper elements based on incomplete or noisy data. The noisy data and incomplete can be identified via statistics derived from the training set. The map can output a code value instead of a substitution for an improper element. An additional stage of image transformation can identify improper pixels having the code value and replace the code value with an analytic value that is more appropriate.

20 Claims, 4 Drawing Sheets

HYBRID TEMPLATE MATCHING FOR IMAGING APPLICATIONS

TECHNICAL FIELD

Embodiments are generally related to digital imaging methods and systems. Embodiments are also related to mapping algorithms that transform an input image to an output image by using a map. Embodiments are additionally related to producing maps from training sets.

BACKGROUND

Digital imaging includes many different operations such as capture, printing, and transformation. Examples of transformation are changing image size, changing image resolution, colorizing, and half toning. Colorizing an operation converting a gray scale image to a color image. Half toning is an operation converting a gray scale image to a binary image made of black and white pixels.

A digital image is made of pixels. An 800×600 digital image is 800 pixels wide and 600 pixels high. There are many varieties of pixels, including color pixels, gray scale pixels, and black and white pixels. A black and white pixel is either black or white. A gray scale pixel is a shade of gray. The most common gray scale has 256 shades of gray ranging from white to black where each shade is represented by a value, or number, between 0 and 255. A color pixel can take many different forms. One popular form is using 3 values denoting shades of red, green, and blue. Similar to gray scale, there can be 256 shades of red, 256 shades of green, and 256 shades of blue. Those skilled in the arts of digital imaging or printing are familiar with these and many other ways to digitally represent an image.

Every pixel in a digital image has other pixels that are adjacent to or otherwise near it. A 3×3 pixel neighborhood is 3 pixels wide, 3 pixels high, and contains 9 pixels. There is 1 center pixel in the middle of the 3×3 neighborhood and the other 8 pixels are the center pixel's adjacent pixels. Adjacent pixels are separated by a 1 pixel distance. A 5×5 pixel neighborhood has a center pixel and 24 pixels that are at most 2 pixels away from the center pixel.

Statistics are used to describe the distribution of a set of numbers. The numbers can be obtained from any data source, including pixel values in a digital image. Mean, median, spread, maximum, minimum, variance, and population are commonly used statistics. Those skilled in the statistical arts know these and many other statistics as well as methods for calculating the statistics when given a set of numbers.

The maximum of a set of numbers is the largest number in the set. The minimum of a set of numbers is the smallest number in the set. The population of a set of numbers is how many numbers are in the set. The spread of a set of numbers is the maximum minus the minimum. The mean of a set of numbers is the sum of the numbers in the set divided by the population size. The median of a set of numbers is the smallest number in the set that is larger than or equal to half of the numbers in the set. The variance of a set of numbers can be calculated by summing the squares of the numbers in the set, subtracting the population size times the squared mean, and dividing by the population size decremented by one. The symmetry of a set of numbers is a value quantifying how evenly the numbers are distributed about their mean.

A pixel neighborhood has statistics. The value of the pixels in the neighborhood can be treated as any other set of numbers. As such, the pixel neighborhood has a mean, median, variance, spread, maximum, minimum, and population size. For example, a 3×3 pixel neighborhood has a population size of 9. In some calculations the center pixel is not used, giving a population size of 8.

Digital images can be transformed via neighborhood operations. A neighborhood operation is the substitution of a pixel neighborhood's center pixel by a substitution value based on the neighborhood. For example, the value of a neighborhood's center pixel can be substituted by the neighborhood mean. Some transformation algorithms create a new image out of the substitution values and leave the original image unchanged. Other transformation algorithms operate in place by directly changing values in the original image. Those skilled in the art of digital imaging know these and many other ways to implement neighborhood transformations.

Neighborhood operations for transforming a binary image, also called a half toned image, to a gray scale image is discussed in U.S. Pat. No. 6,343,159, titled "Method and apparatus for modeling and reconstruction of halftoned images".

Smoothing is a neighborhood transformation in which the center value of a pixel neighborhood is selected based on a weighted summation across the pixel neighborhood. Linear interpolation is a neighborhood operation based on linear analysis of the center pixel's neighbors. Those skilled in digital imaging often refer to smoothing as low-pass filtering and know many ways to calculate and use low pass filters as well as many linear interpolation methods.

Frequency interpolation can be used to replace pixels in a large neighborhood or entire image. The frequency content of the image or neighborhood can be obtained and used to calculate values for pixels that are absent or corrupt in the original image.

Mapping is a transformation that uses a map. A map can be represented as a table of input values and output values. Each input value has an associated output value. For example, a very simple map has a single input value of 100 and a substitution value of 125 associated with it. Transforming a set of numbers such as {0, 50, 100, 150, 200} using the map results {0, 50, 125, 150, 200}. The only difference is that the value of 100 is mapped to 125. A larger map can result in more numbers being mapped.

As discussed above, a digital image can be treated as a set of numbers. As such, a map can be used to transform a digital image. Maps are helpful when images have been modified, but the exact modification is unknown. As such, a group of input images is known and a modified image corresponding to each input image is known. The modified images are often called the desired images. The collection of input images and desired images is called a training set. Many algorithms exist that produce maps when given a training set. One problem is incomplete maps where some input pixel values are not in the map because they were not in the training set. Another problem is noisy maps where some input pixel values occur often in the training set, but with inconsistent output pixel values.

A need therefore exists for systems and methods that can transform an input image to an acceptable output image when incomplete or noisy maps are used. Such a goal can be accomplished through the application of code values and analytic substitutions.

BRIEF SUMMARY

Aspects of the embodiments address limitations and flaws in the prior art by using a code value to flag pixels that are not properly mapped and replacing the flagged pixels with analytic values.

It is therefore an aspect of the embodiments to obtain a map that has map elements. A map element is a map template and an associated substitution. A map template can be a single pixel value or can be a neighborhood with a center pixel as described above.

It is also an aspect of the embodiments to obtain an input image that contains input templates. The input templates can be the input image's pixels or can be neighborhoods with a center pixel. Every pixel in the input image can be treated as the center pixel of a neighborhood. As such, there is an input template corresponding to every pixel in the input image.

It is a further aspect of the embodiments to use the map to create a transitional image from the input image. As discussed above, a map consists of map elements. Each map element contains a map template and a substitution. Also as discussed above, a map can be used to replace an input value with an output value. Every pixel has a value. As such, each input pixel can be mapped to an output pixel. The maps here, however, map an input template, which can contain many values, to a substitution, which is a single value. Single pixel templates simply map each input pixel to a substitution. Neighborhood templates require finding a map template, called a match, which matches the input template. Those skilled in the arts of pattern recognition or image analysis know of many template matching algorithms that can be used for finding a map template matching an input template. Furthermore, when neighborhood templates are used the input to the map is a neighborhood but the output, or substitution, is a value. As such, the map as treated as mapping the center pixel of the neighborhood to the substitution.

It is a yet further aspect of the embodiments to create an output image from the transitional image. As discussed above, some inputs to a map can result in a noisy or an undefined output. Aspects of the embodiments use maps that output a code value instead of an undefined or noisy output. The transitional image is made of transitional pixels. If a transitional pixel has the code value, then the map failed to produce a proper value for that pixel. A proper value for the pixel can be found analytically, in which case it is an analytic value. Analytic values can be found via analysis of the input image, transitional image, or output image. Examples of analytic values are neighborhood mean and neighborhood median. Analytic values can also be found via smoothing, linear interpolation, or frequency interpolation.

It is a still yet further aspect of the embodiments to obtain a training set, which is made of pairs of input images and desired images. The training set is used to produce a map that, when used on an input image, produces the associated desired image. Before a map can be produced, an analysis set is produced. An analysis set contains candidates. A candidate has a candidate template and substitution statistics. Candidate templates are the templates that can be found in the input images.

For example, the input images can be half tone images and the desired images can be gray scale images. The templates can be 3×3 neighborhoods. Therefore, there are 512 candidate templates. Every neighborhood in the input images has a center pixel and every pixel in an input image has a corresponding pixel in a desired image, called a desired pixel. As such, every neighborhood, or input template, in the input image matches one of the 512 candidate templates and has a desired pixel. The input templates associate each of the candidate templates with zero or more desired pixels. The set of desired pixels associated with a candidate template can be used to produce substitution statistics such as the mean, variance, population, spread, and symmetry.

Another aspect of the embodiments is classifying each candidate as a normal candidate or a rogue candidate. The substitution statistics can be used for the classification. For example zero population indicates that the training set contained no data for the candidate. A candidate with a zero population should be considered rogue. In actuality, a population lower than a threshold, such as 7 or 12, can indicate that the training set did not contain enough data. A higher population can indicate that the candidate is a normal candidate. Other substitution statistics or combinations of substitution statistics can be similarly used.

Yet another aspect of the embodiments is to use the analysis set to create a map. Every candidate template becomes a map template. Substitutions are associated with every map template to complete the map. Map templates from rogue candidates get substitutions equal to a code value. Map templates from normal candidates get a substitution based on the substitution statistics such as the mean, median, or the desired pixel value that occurred the most. In all cases, however, the substitution for a normal candidate should not equal the code value.

BRIEF DESCRIPTION OF THE DRAWINGS

The accompanying figures, in which like reference numerals refer to identical or functionally similar elements throughout the separate views and which are incorporated in and form a part of the specification, further illustrate the present invention and, together with the background of the invention, brief summary of the invention, and detailed description of the invention, serve to explain the principles of the present invention

DETAILED DESCRIPTION OF THE INVENTION

The particular values and configurations discussed in these non-limiting examples can be varied and are cited merely to illustrate embodiments and are not intended to limit the scope of the invention.

Figure 1:
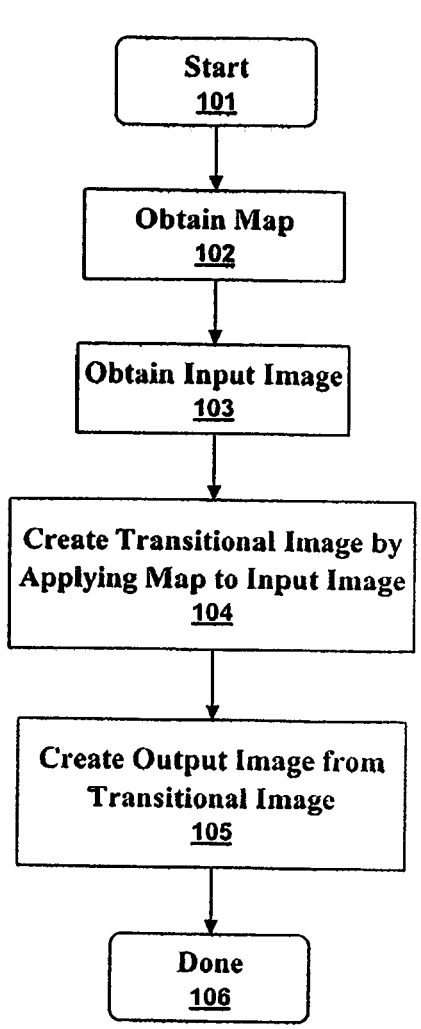
FIG. 1 illustrates a high level flow diagram of obtaining an output image from a map and an input image in accordance with an aspect of the embodiments.

FIG. 1 illustrates a high level flow diagram of obtaining an output image from a map and an input image in accordance with an aspect of the embodiments. After the start 101, a map is obtained 102 and an input image is obtained 103. Next, applying the map to the input image creates a transitional image 104. An output image is then created from the transitional image 105 and the process is done 106.

Figure 2:
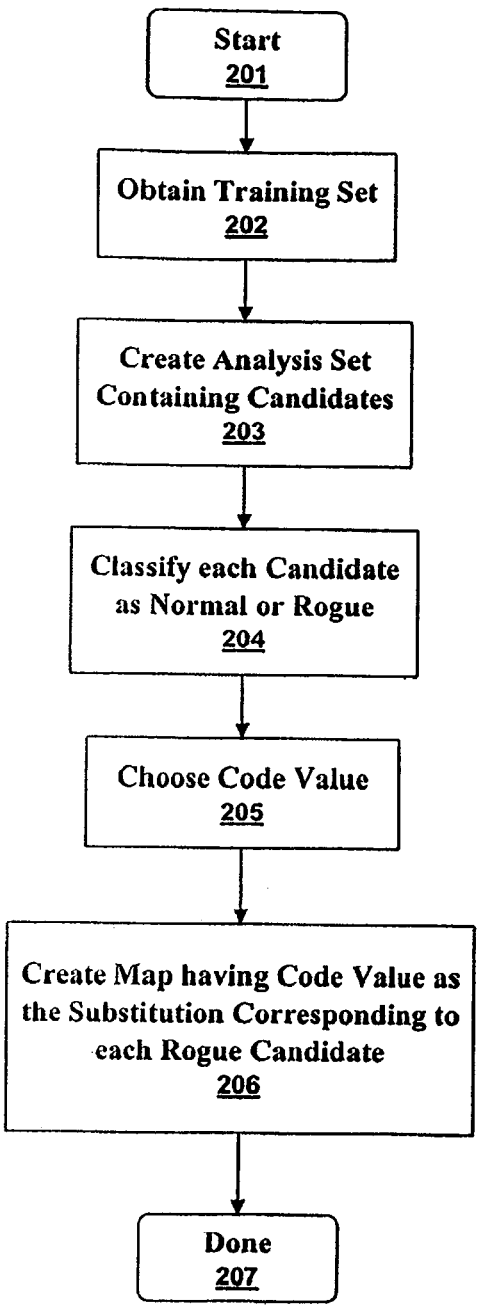
FIG. 2 illustrates a high level flow diagram of creating a map from a training set in accordance with an aspect of the embodiments.

FIG. 2 illustrates a high level flow diagram of creating a map from a training set in accordance with an aspect of the embodiments. After the start 201 a training set is obtained 202 from which an analysis set containing candidates is created 203. The candidates are then classified as normal or rogue 204. A code value is chosen 205. Finally the map is created using the code value as the substitution for rogues 206 and the process is done 207.

Figure 3:
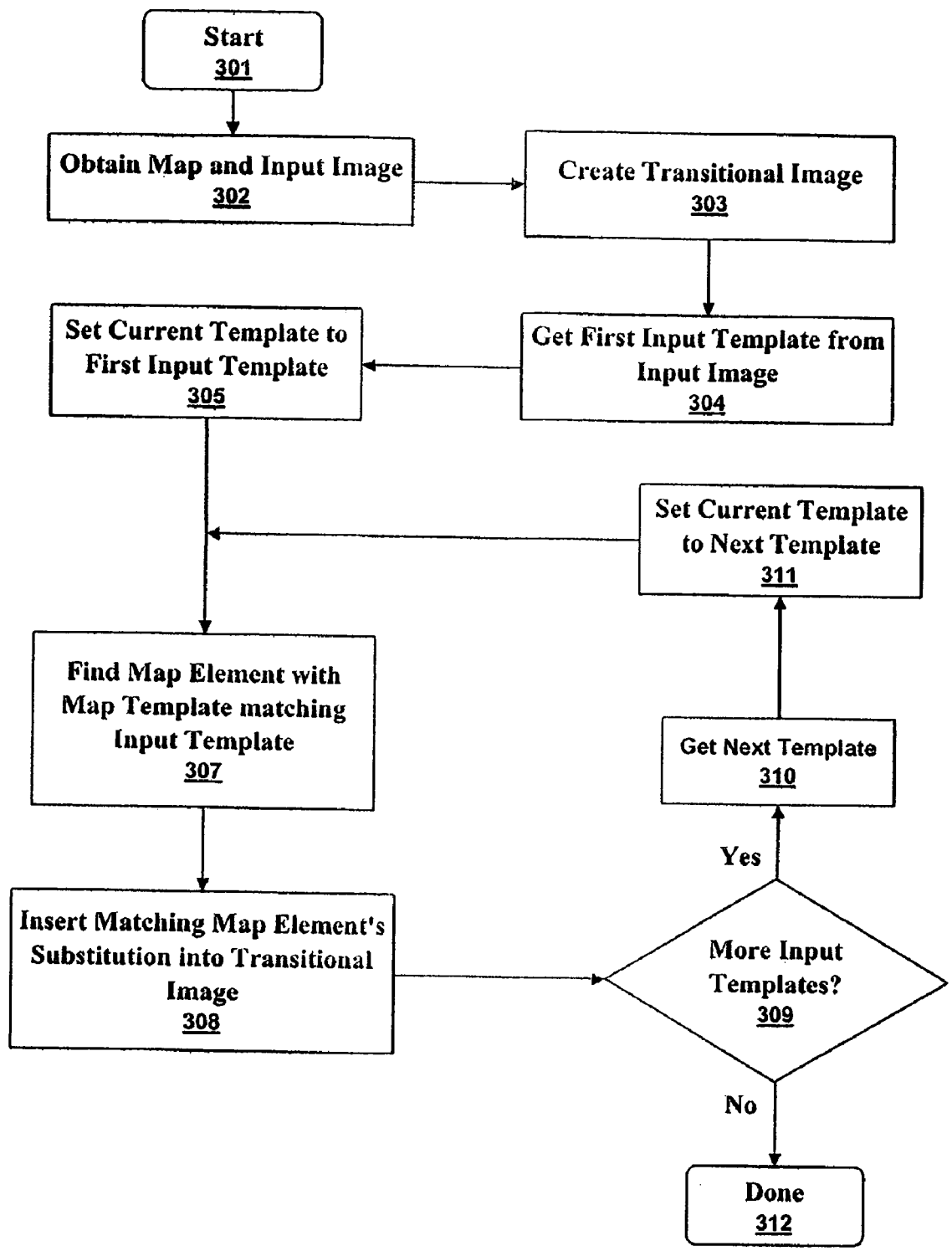
FIG. 3 illustrates a high level flow diagram of producing a transitional image from a map and an input image in accordance with an aspect of the embodiments.

FIG. 3 illustrates a high level flow diagram of producing a transitional image from a map and an input image in accordance with an aspect of the embodiments. After the start 301, a map and an input image are obtained 302. Next a transitional image is created 303. Here, the transitional image is created as a blank image into which transitional pixels will be inserted later. Next, the first template from the input image is obtained 304 and set to the current template 305. A map element with a map template matching the input template is then found 307. The substitution from the matching map element is then inserted as a transitional pixel into the transitional image. The position of the transitional pixel in the transitional image corresponds to the position of the current template's center pixel in the input image. If there are no more input temples 309 the process is done 312. Otherwise, the next input template is obtained 310 and set as the current template 311. The process then loops back to finding a matching map element 307.

Figure 4:
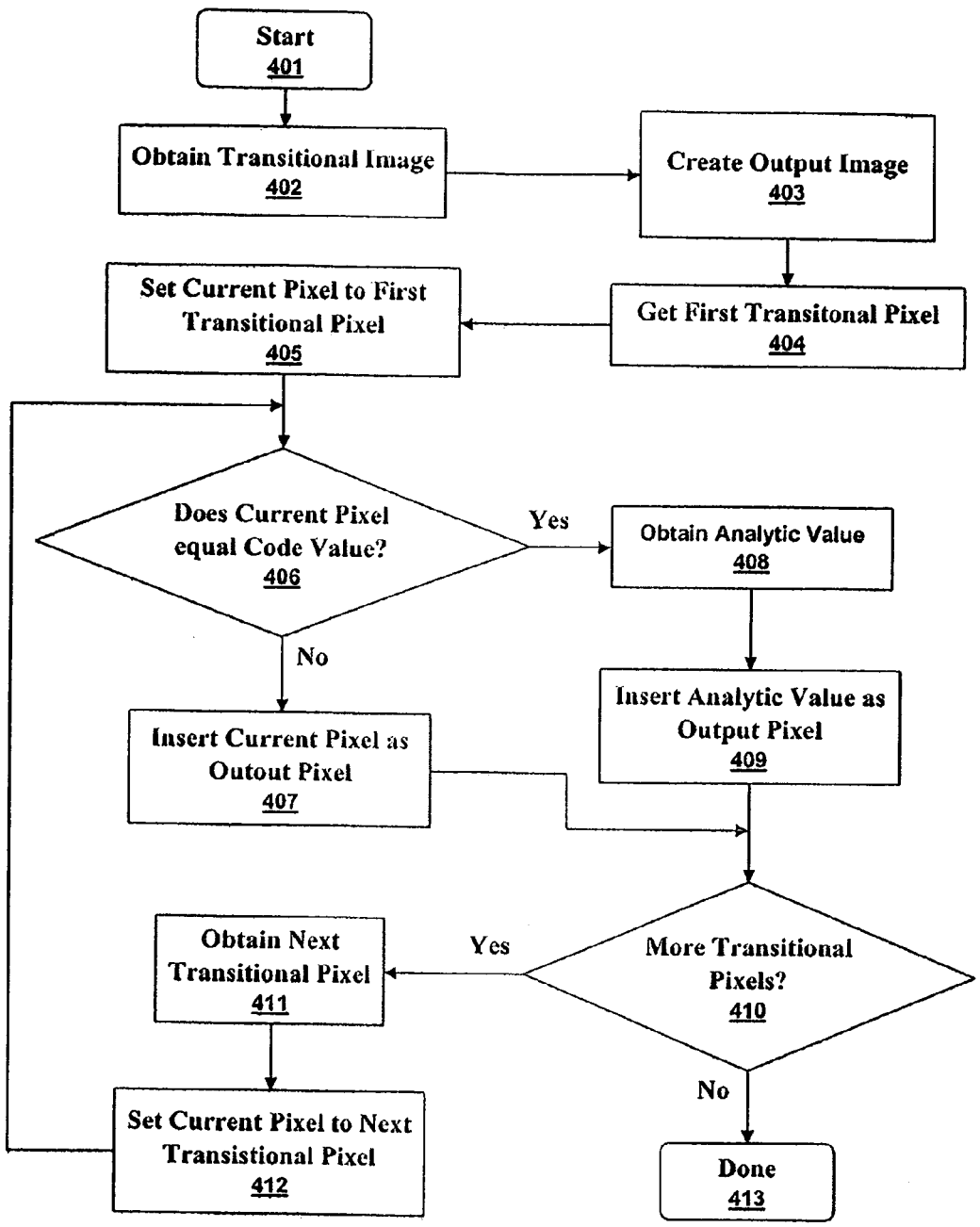
FIG. 4 illustrates a high level flow diagram of producing an output image from a transitional image in accordance with an aspect of the embodiments.

FIG. 4 illustrates a high level flow diagram of producing an output image from a transitional image in accordance with an aspect of the embodiments. After the start 401, a transitional image is obtained 402. An output image is created 403 as a blank image into which output pixels can be inserted. The first transitional pixel is obtained 404 and set as the current pixel 405. If the current pixel equals the code value 406, then an analytic value for the final pixel is obtained 408 and inserted as an output pixel 409 into the output image. Otherwise, the current pixel is inserted 407. If there are more transitional pixels, the next one is obtained 411 and set as the current pixel 412. The process then loops back to comparing the current pixel to the code value 406. If there are no more transitional pixels 410, the process is done 413.

Figure 5:
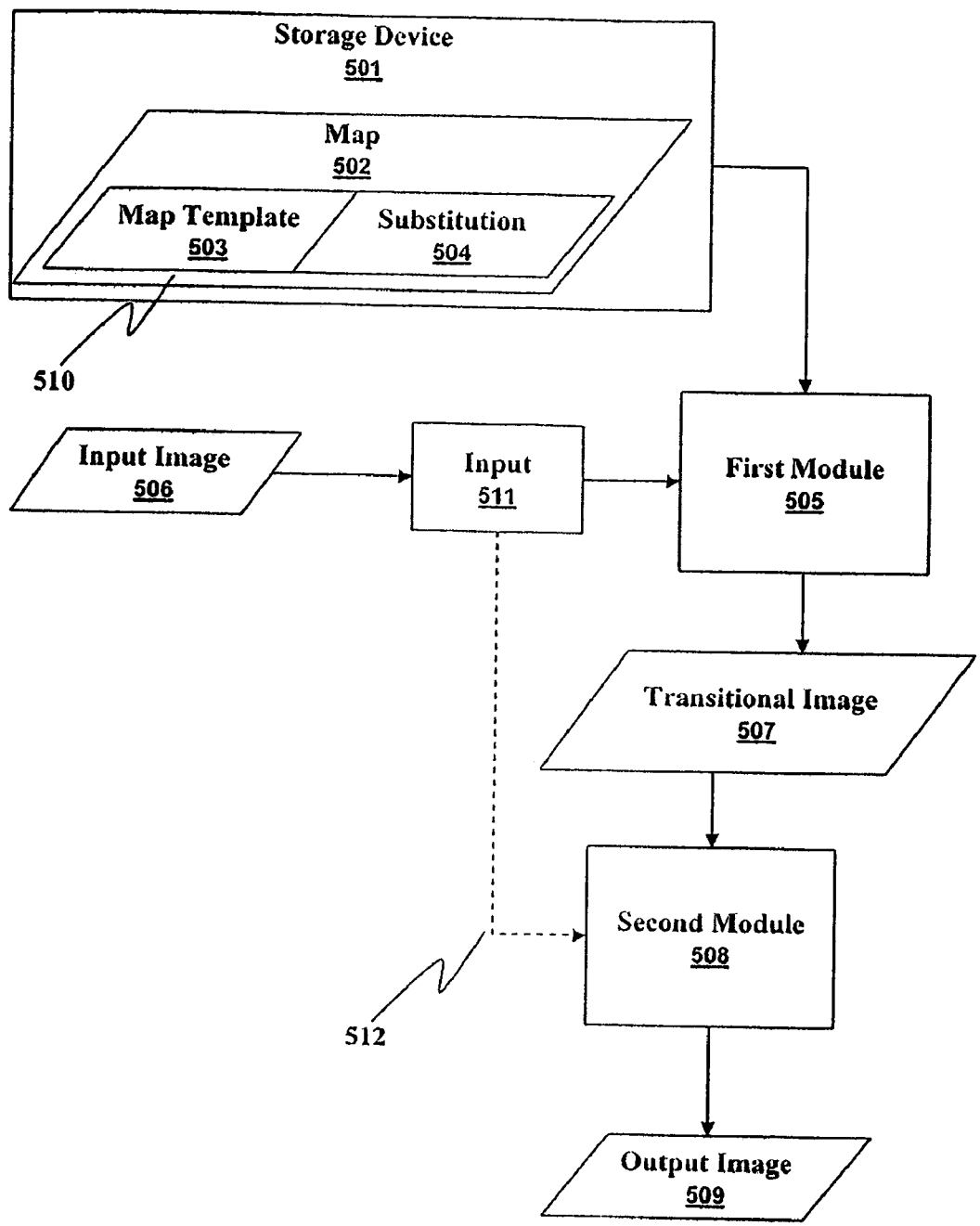
FIG. 5 illustrates a system for producing an output image from an input image and a map in accordance with an aspect of the embodiments.

FIG. 5 illustrates a system for producing an output image from an input image and a map in accordance with an aspect of the embodiments. A storage device 501 holds a map 502 containing map elements 510. A map element 510 includes a map template 503 and a substitution 504. A first module 505 obtains the map 502 from the storage device 501 and also obtains an input image 506 from an input 511. The first module creates a transitional image 507 that can be passed to a second module 508. The second module 508 creates an output image 509 from the transitional image 507

A dashed line 512 is shown connecting the input 511 to the second module 508 because, in some embodiments, the second module can use the input image 506 to help produce analytic values that are inserted into the output image 509. For example, the dashed line 512 can represent picture tags and text tags produced by the input 511 based on the input image 506 and passed to the second module 508. A picture tag can be associated with an input pixel or transitional pixel to indicate that it came from a pictorial region of an image. Similarly, a text tag indicates a pixel is from a text region. In practice, a single binary value can be used as a picture or text tag with one value indicating picture and the other value indicating text.

Embodiments can be implemented in the context of modules. In the computer programming arts, a module can be typically implemented as a collection of routines and data structures that performs particular tasks or implements a particular abstract data type. Modules generally can be composed of two parts. First, a software module may list the constants, data types, variable, routines and the like that can be accessed by other modules or routines. Second, a software module can be configured as an implementation, which can be private (i.e., accessible perhaps only to the module), and that contains the source code that actually implements the routines or subroutines upon which the module is based. Thus, for example, the term module, as utilized herein generally refers to software modules, hardware modules, or implementations thereof. Such modules can be utilized separately or together to form a program product that can be implemented through signal-bearing media, including transmission media and recordable media.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method comprising:
    obtaining a map comprising at least one map element comprising a map template and a substitution and obtaining an input image comprising at least one input template;
    a step for creating a transitional image comprising transitional pixels comprising at least one code value pixel having a value equal to a code value; and
    a step for creating an output image from the transitional image.

2. The method of claim 1 wherein the transitional image is created in place from the input image.

3. The method of claim 1 wherein the output image is created in place from the transitional image.

4. The method of claim 1 wherein the input image is a binary image and the output image is a gray scale image.

5. The method of claim 1 further comprising using linear interpolation to find at least one analytic value wherein the at least one code value pixel is mapped to at least one output image pixel having the at least one analytic value.

6. The method of claim 1 further comprising using smoothing to find at least one analytic value wherein the at least one code value pixel is mapped to at least one output image pixel having the at least one analytic value.

7. The method of claim 1 further comprising using frequency interpolation to find at least one analytic value wherein the at least one code value pixel is mapped to at least one output image pixel having the at least one analytic value.

8. The method of claim 1 further comprising using a neighborhood mean as one of at least one analytic value wherein the at least one code value pixel is mapped to at least one output image pixel having the at least one analytic value.

9. The method of claim 1 further comprising using a neighborhood median as one of at least one analytic value wherein the at least one code value pixel is mapped to at least one output image pixel having the at least one analytic value.

10. The method of claim 1 further comprising using a text tag or image tag to guide the choice of the one of at least one analytic value that is copied to the output pixel.

11. A method comprising:
    obtaining a training set comprising at least one training pair comprising a input image and desired image and creating an analysis set comprising at least one candidate comprising a candidate template and substitution statistics comprising at least one statistic; and
    a step for classifying each of the at least one candidate as a normal candidate or a rogue candidate; and
    a step for creating a map comprising a plurality of map elements each comprising a map template and a map substitution wherein rogue candidate result in map elements having map substitutions equaling a code value.

12. The method of claim 11 wherein a rogue candidate is a candidate having substitution statistics indicating a variance higher than a variance threshold.

13. The method of claim 11 wherein a rogue candidate is a candidate having substitution statistics indicating a spread higher than a spread threshold.

14. The method of claim 11 wherein a rogue candidate is a candidate having substitution statistics indicating symmetry lower than a symmetry threshold.

15. The method of claim 11 wherein a rogue candidate is a candidate having substitution statistics indicating a population less than a population threshold.

16. The method of claim 11 wherein at least one of the map substitutions is a mean.

17. The method of claim 11 wherein at least one of the map substitutions is a median.

18. The method of claim 11 wherein at least one of the map substitutions is a most common value.

19. The method of claim 11 wherein the input image in each of the at least one training pair is a half tone image and the desired image in each of the at least one training pair is a gray scale image.

20. A system comprising:
- a storage device storing a map comprising a plurality of map elements each comprising a map template and a substitution wherein the substitution of at least one of the map elements equals a code value;
- a means for obtaining an input image;
- a means for producing a transitional image wherein the transitional image comprises a plurality of transitional pixels and at least one of the transitional pixels has a value equaling the code value; and
- a means for producing an output image.

* * * * *